(No Model.)
H. ROEKEL.
GAS AND FLUID PRESSURE REGULATOR.
No. 301,524. Patented July 8, 1884.
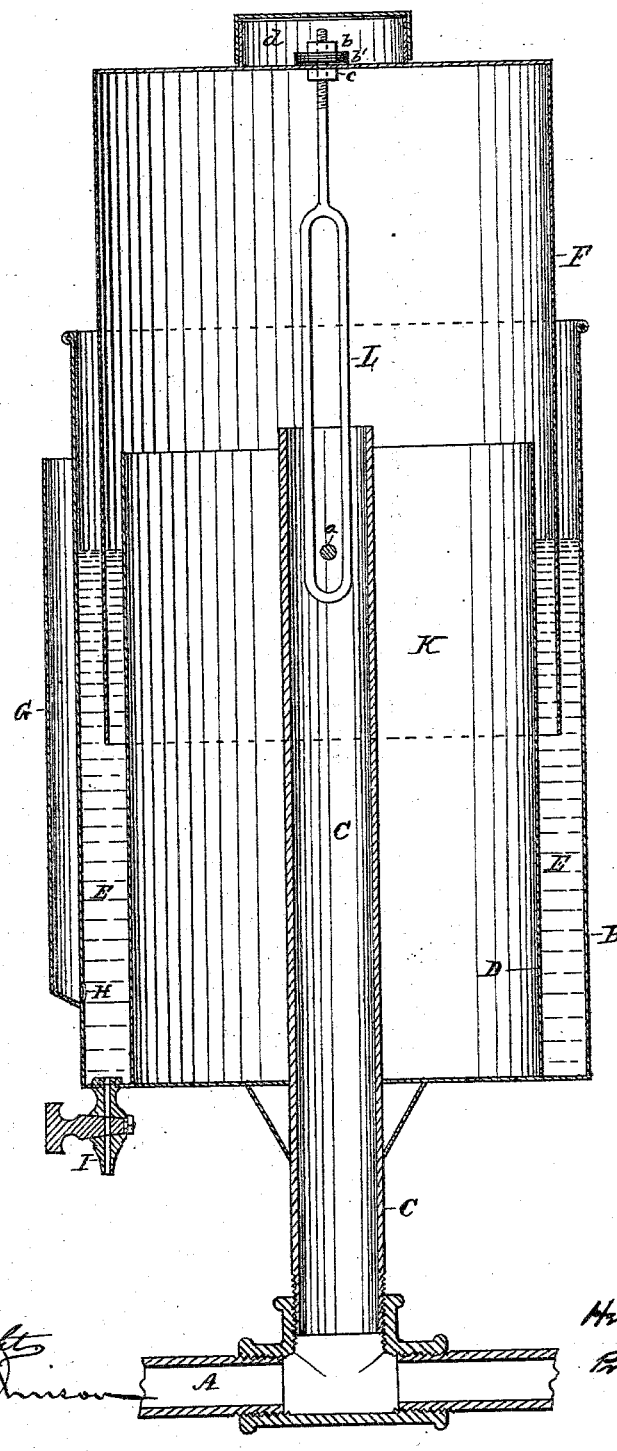
Witnesses:
Inventor:
Henry Roekel
Attorney

UNITED STATES PATENT OFFICE.

HENRY ROEKEL, OF ZANESVILLE, OHIO.

GAS AND FLUID PRESSURE REGULATOR.

SPECIFICATION forming part of Letters Patent No. 301,524, dated July 8, 1884.

Application filed March 19, 1884. (No model.)

*To all whom it may concern:*

Be it known that I, HENRY ROEKEL, a citizen of the United States, residing at Zanesville, in the county of Muskingum and State of Ohio, have invented certain new and useful Improvements in Gas and Fluid Pressure Regulators, of which the following is a specification, reference being had therein to the accompanying drawing.

My invention relates to improvements in gas cushion or pressure regulating chambers to be used in connection with gas-engines.

The object of my invention is to prevent the disturbance of the volume of gas in the supply-pipe, and to obviate the flickering or unequal burning of the gas in other burners which receive their supply of gas from the same source which supplies the engine, such flickering being caused by the explosion of the gas in the engine, and the consequent rushing in of gas to supply or fill the vacuum caused by such explosion.

My invention consists of a cylinder or other shaped vessel having a concentric cylinder or vessel secured therein, a movable inverted cylinder adapted to fit within the space between the two first-mentioned cylinders, and a pipe connecting the cavity of the inverted cylinder or vessel directly with the supply-pipe without the intervention of valves.

My invention consists, further, in certain details of construction, which will be fully described hereinafter, and pointed out in the claims.

Referring to the drawing, the figure represents a vertical sectional view of my device.

A is the gas-pipe which connects the engine with the source of supply, to which is secured the cylinder or vessel B by means of the short pipe C, which projects up into said cylinder B, and is rigidly secured to the bottom of the same.

D is a smaller cylinder located within the cylinder B, rigidly secured to the bottom thereof and concentric thereto. The space E between the inner wall of the cylinder B and the outer wall of the cylinder D is a water-space, in which water is placed to form a water-seal joint between the cylinders or other shaped vessels B D and the inverted cylinder F. The water is supplied to the chamber or space E through the pipe G, secured on the outside of the cylinder B, and which communicates with the space E by means of the duct H. The pipe or tube G may be made of glass or other suitable material.

I is a drain-cock to let the water out of the chamber E, so that fresh water may be readily supplied when necessary.

As before stated, F is an inverted cylinder or vessel, closed at its upper end, while its lower end is open and adapted to slide down over the cylinder D and within the outer cylinder, B, and rest in the water-space, thus forming a closed gas-chamber, K, which communicates with the pipe A by means of the pipe C. The cylinder F is designed to rise and fall within the space E when the pulsations occur caused by the explosion of the gas in the engine, and to prevent its rising too far I employ a slotted rod, L, through the slotted portion of which the pin $a$ is passed, the ends of said pin being secured in the walls of the tube C. The upper end of the rod L is passed through the top of the cylinder F, and is secured thereto by a nut, $b$, a washer, $b'$, of leather or rubber, and a jam-nut, $c$, being secured to the rod on the under side of the top or cover of the cylinder F, so that the cylinder will be centered and guided in its upward and downward movements.

$d$ is a cavity or pocket formed on the top of the cylinder F, in which shot or other suitable weights may be placed, to regulate the amount of resistance required of the cylinder F to conform to the pressure of the gas in the pipe A.

It will be noticed that when an explosion of gas occurs in the engine the cylinder F will descend, thus forcing forward a fresh supply of gas to the engine for the next explosion, and when a sufficient quantity of gas has rushed forward to fill the vacuum caused by the explosion the pressure of gas in the pipe A will force the gas into the chamber K and again raise the cylinder F. The cushion or pressure-regulator formed by the devices already described serves to regulate the pressure of the gas to the engine, so that the gas which supplies the burners in other portions of the building or in the vicinity from the same service-pipe will not be disturbed by the intermittent supply given to work the engine.

It will be further noticed that the gas in the chamber K acts as a cushion, the flow of the gas is uninterrupted, and the use of valves, stops, &c., entirely dispensed with, so that my device is simple and cheap in its construction and reliable and efficient in its operation.

It will of course be understood that the size of the cylinders and the holding capacity of the gas-chamber will be varied according to the size and capacity of the engine on which it is to be used—for instance, for a four-horse-power engine the diameter of the outer cylinder will be about seven inches and the length or height about ten inches.

Having thus described my invention, what I claim, and desire to secure by Letters Patent, is—

1. A gas and fluid pressure regulator consisting of a cylinder or vessel, B, having a concentric cylinder or vessel, D, secured therein, a movable inverted cylinder or vessel, F, adapted to fit within the space between the cylinders B and D, and a pipe, C, connecting the cavity or chamber of the cylinder or vessel D directly with the supply-pipe without the intervention of valves, as set forth.

2. In a device for regulating the pressure of gas to a gas-engine, the rod L, slotted as described, the upper end of which is connected to the cylinder F, in combination with the pipe K and pin $a$, whereby the cylinder F is prevented from rising too far, as set forth.

In testimony whereof I affix my signature in presence of two witnesses.

HENRY ROEKEL.

Witnesses:
C. A. NEALE,
ROLLIN M. MORGAN.